(12) United States Patent
Maretto et al.

(10) Patent No.: US 7,579,382 B2
(45) Date of Patent: *Aug. 25, 2009

(54) PROCESS FOR THE CHARGING OF A CATALYST INTO A REACTOR SUITABLE FOR REACTIONS IN HETEROGENEOUS PHASE

(75) Inventors: Cristina Maretto, Lodi (IT); Giovanni Pederzani, San Donato Milanese-Milano (IT)

(73) Assignees: ENI S.p.A., Rome (IT); Institut Francais du Petrole, Rueil Malmaison (FR); Enitecnologie S.p.A., San Donato Milanese-Milan (IT)

( * ) Notice: Subject to any disclaimer, the term of this patent is extended or adjusted under 35 U.S.C. 154(b) by 602 days.

This patent is subject to a terminal disclaimer.

(21) Appl. No.: 10/571,125

(22) PCT Filed: Sep. 17, 2004

(86) PCT No.: PCT/EP2004/010650

§ 371 (c)(1),
(2), (4) Date: Mar. 9, 2006

(87) PCT Pub. No.: WO2005/026293

PCT Pub. Date: Mar. 24, 2005

(65) Prior Publication Data

US 2007/0066690 A1    Mar. 22, 2007

(30) Foreign Application Priority Data

Sep. 18, 2003  (IT) .......................... MI2003A1776

(51) Int. Cl.
*C07C 27/00* (2006.01)
(52) U.S. Cl. ................. 518/700; 518/715; 518/728
(58) Field of Classification Search ................. 518/700, 518/715, 728
See application file for complete search history.

(56) References Cited

FOREIGN PATENT DOCUMENTS

WO         03/068715        8/2003

*Primary Examiner*—Jafar Parsa
(74) *Attorney, Agent, or Firm*—Oblon, Spivak, McClelland, Maier & Neustadt, P.C.

(57) ABSTRACT

Process for the charging of a catalyst and for the running of a reactor in which reactions take place in multiphase systems, wherein a gaseous phase prevalently consisting of CO and H2 is bubbled into a suspension of a solid in the form of particles (catalyst) in a liquid (prevalently reaction product), according to the Fischer-Tropsch technology.

20 Claims, 1 Drawing Sheet

Figure 1:
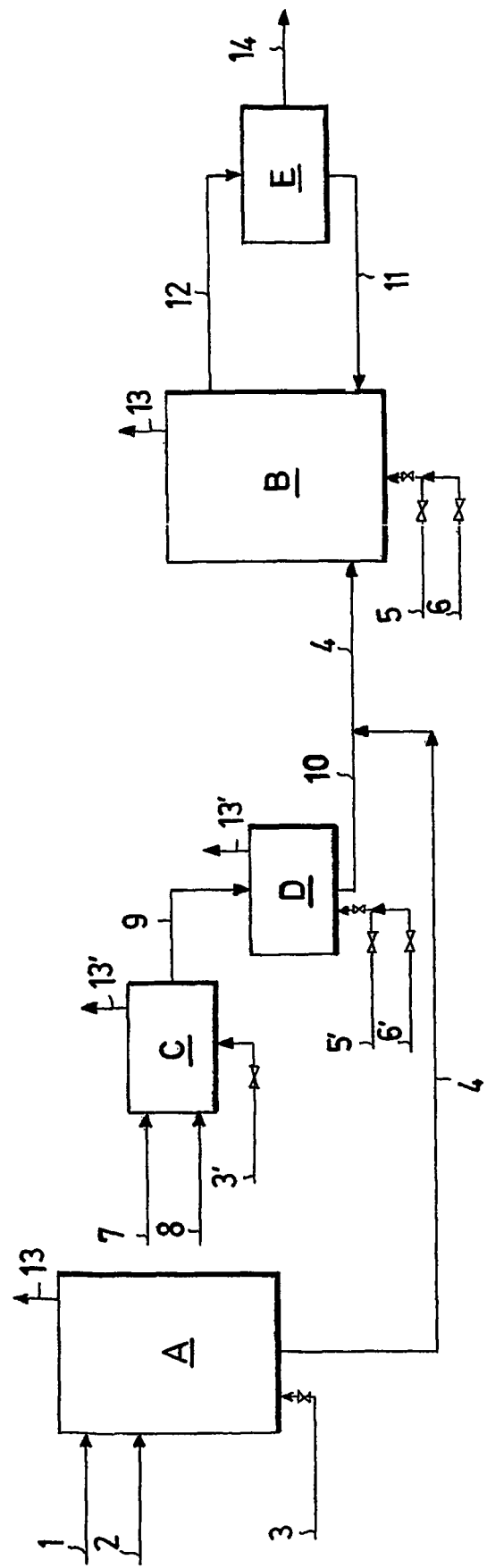

PROCESS FOR THE CHARGING OF A CATALYST INTO A REACTOR SUITABLE FOR REACTIONS IN HETEROGENEOUS PHASE

The present invention relates to a process for charging a catalyst into a reactor suitable for reactions in heterogeneous phase.

More specifically, the present invention relates to a process for charging a catalyst into a reactor suitable for reactions in heterogeneous phase and for its running, combined with reactions which take place in fluidized multiphase systems.

Even more specifically, the present invention relates to a process for the charging of a catalyst and for the running of a reactor in which reactions take place in multiphase systems, wherein a gaseous phase, prevalently consisting of CO and $H_2$, is bubbled into a suspension of a solid in the form of particles (catalyst) in a liquid (prevalently reaction product), according to the Fischer-Tropsch technology.

The Fischer-Tropsch technology is known in literature, for preparing hydrocarbons from mixtures of gas based on hydrogen and carbon monoxide, conventionally known as synthesis gas. A document which summarizes the main works on the Fischer-Tropsch synthesis reaction is represented by Sie and Krishna, Appl. Catalysis A: General (1999), 186, 55-70.

The Fischer-Tropsch technology is generally based on the use of slurry reactors, reactors which are normally used in relation to chemical reactions which are carried out in multiphase systems in which a gaseous phase is bubbled into a suspension of a solid in a liquid. In the case of Fischer-Tropsch, the gaseous phase consists of synthesis gas, with a molar ratio $H_2/CO$ ranging from 1 to 3, the liquid phase, at the reaction temperature, prevalently consists of the reaction product, i.e. essentially linear hydrocarbons with a high number of carbon atoms, and the solid phase is prevalently represented by the catalyst.

The Fischer-Tropsch reaction is a exothermic reaction which, for its industrial embodiment, requires internal heat exchanger devices, for removing the heat produced and for controlling the thermal profile inside the reactor.

The objective of the present invention is the running of the phases which are not included in the normal operating conditions for Fischer-Tropsch reactions and which are particularly critical for the catalyst performances, such as for example:
- charging;
- start-up/conditioning;
- make-up (subsequent additions of catalyst);
- temporary or definite shut-down of the reaction section;
- re-start-up after the temporary shut-down.

In scientific literature, for example published in Australian patent application AU 200066518 A1, a process is described for treating, in the charging phase, a catalyst for Fischer-Tropsch reactions which are carried in fluidized multiphase reactors and for running these during the shut-down or re-start-up phases.

The Applicants have now found an alternative process to that of the known art, for charging a catalyst into a bubble column slurry reactor and methods for the running of said reactor outside the normal operating conditions. The description of these methods is effected with the help of FIG. 1 enclosed.

An object of the present invention therefore relates to a process for the charging of a catalyst into a bubble column slurry reactor (B) in start-up phase which comprises:

a) incorporating the catalyst, previously reduced, in a matrix of paraffinic waxes, for example in the form of pellets, tablets or granules, solid at room temperature;

b) melting and collecting the paraffinic matrix (1) in a vessel (A), maintained at a high temperature, together with a diluent (2) which is miscible with the molten paraffinic matrix and which is in liquid form both under the conditions present in the container and at room temperature, a stream of inert gas (3) being distributed in said vessel (A) from the bottom so as to obtain a sufficiently homogeneous suspension;

c) pressurizing the vessel (A), in which the complete melting of the paraffinic matrix has been effected, at a pressure higher than that of the reactor (B) maintaining the system fluidized by the continuous introduction of inert gas from the bottom of said vessel;

d) transferring, due to the pressure change, the diluted solution (4) from the vessel (A) under pressure to the reactor (B), initially empty, maintained at a temperature higher than or equal to that present in the vessel (A) flushed in turn from the bottom with inert gas (5);

e) repeating steps (b) to (d) until a suspension level is reached in the reactor (B) which is sufficient for aligning the optional external equipment (E) envisaged for the treatment of the suspension (for example, degasifier, liquid-solid separators, pumps, etc.);

f) repeating steps (b) to (d) until the normal operating suspension level is reached in the reactor (B) and in the optional external equipment (E) envisaged for the treatment of the suspension;

g) feeding the synthesis gas (6) diluted with an inert gas to the base of the reactor (B).

According to the present invention, the inert gas can consist, for example, of nitrogen or, preferably, purified natural gas.

The catalyst is englobed in paraffinic waxes in the form of cylindrical blocks, wherein the quantity of wax ranges from 30 to 70% by weight. Any catalyst capable of being active in Fischer-Tropsch reactions can be used in the process object of the present invention. The preferred catalyst, according to the present invention, is based on Co dispersed on a solid carrier consisting of at least one oxide selected from one or more of the following elements: Si, Ti, Al, Zr, Mg. Preferred carriers are silica, alumina or titania and their mixtures.

The cobalt is present in the catalyst in quantities ranging from 1 to 50% by weight, generally from 5 to 35% with respect to the total weight.

The catalyst used in the process, object of the present invention, can comprise further additional elements. It can comprise, for example, with respect to the total, from 0.05 to 5% by weight, preferably from 0.1 to 3%, of ruthenium and from 0.05 to 5% by weight, preferably from 0.1 to 3%, of at least a third element selected from those belonging to group 3 (IUPAC regulation). Catalysts of this type are known in literature and described, together with their preparation, in European patent 756,895.

Further examples of catalysts are again based on cobalt but containing, as promoter element, tantalum in quantities of 0.05-5% by weight, with respect to the total, preferably 0.1-3%. These catalysts are prepared by first depositing a cobalt salt on the inert carrier (silica or alumina), for example by means of the dry impregnation technique, followed by a calcination step and, optionally, a reduction and passivation step of the calcined product.

A derivative of tantalum (particularly tantalum alcoholates) is deposited on the catalytic precursor thus obtained, preferably with the wet impregnation technique followed by calcination and, optionally, reduction and passivation.

The catalyst, whatever its chemical composition may be, is used in the form of a finely subdivided powder having an average diameter of the granules ranging from 10 to 250 µm.

The catalyst, englobed in the paraffinic matrix, is brought to a temperature higher than or equal to 150° C., for example, from 150 to 220° C., and diluted with a diluent liquid at those temperatures, and also at room temperature, for example with an oligomer of $C_6$-$C_{10}$ α-olefins, until a concentration of solid ranging from 10 to 50% by weight is obtained. After the complete melting of the paraffinic matrix, the suspension is transferred into the reactor (B), maintained at a temperature higher than or greater than that of the melting vessel (A), by means of an internal heat exchanger. Under normal operating conditions, the exchanger serves for removing the reaction heat produced and maintaining the conditions more or less isothermal in the whole reaction volume.

During the transfer of the suspension, the reactor (B) is at a pressure lower than that present in the charging vessel (A) in order to favour the passage of the suspension from the vessel to the reactor due to the difference in pressure. The pressure in the charging vessel (A) is generally higher than that present in the reactor (B) by about 0.2-0.4 MPa whereas the pressure inside the reactor is maintained at about 0.1-1 MPa. For the whole duration of the transfer process, a stream of inert gas (5) is maintained at the bottom of the reactor (B) to guarantee the suspension of the catalyst, thus preventing its sedimentation.

Both the temperature and pressure present inside the reactor (B) during the charging phase are lower than the values present during regime synthesis conditions. The Fischer-Tropsch reaction is in fact carried out at temperatures equal to or higher than 150° C., for example ranging from 200 to 350° C., maintaining a pressure ranging from 0.5 to 5 MPa inside the reactor. More significant details on Fischer-Tropsch reactions are available in "Catalysis Science and Technology", vol. 1, Springer-Verlag, New York, 1981.

In order to reach the normal operating level inside the reactor (B) and all the optional apparatuses (E) envisaged for the treatment of the suspension, the melting, dilution and transfer from the charging vessel (A) to the reactor (B) are repeated various times. In relation to the concentration of the catalyst desired and plant production capacity, this operation can be repeated, for example, from 2 to 30 times.

During the first and subsequent charging steps, the reactor (B) is kept isolated from the optional equipment (E) envisaged for the treatment of the suspension, until an adequate suspension level is reached in the reactor itself enabling it to be aligned with said equipment (E). The charging steps are then completed until the normal operating level is reached. The vessels (A) and (B) have outlets (13) for the recovery of the vapour phase (inert gas and/or non-reacted synthesis gas, and/or synthesis reaction products in vapour phase under the reaction conditions).

At the end of the charging phase, before bringing the system to the normal reaction and production conditions (14), a conditioning phase of the catalyst is activated. More specifically, at the end of the charging, the reactor (B) is in temperature conditions ranging from 150 to 220° C. and a pressure ranging from 0.1 to 1 MPa, and is continuously fed with inert gas. The conditioning phase of the catalyst comprises:

a) regulating the temperature and pressures at values suitable for the conditioning, i.e. within the range of 200-230° C. and 0.5-1.5 MPa;
b) gradually substituting the inert gas with synthesis gas, up to a concentration of inert gas ranging from 5 to 50% by volume and maintaining a partial water pressure (co-product of the Fischer-Tropsch synthesis reaction) lower than 1.0 MPa, preferably lower than 0.5 MPa, more preferably lower than 0.3 MPa;
c) maintaining the conditions of point (b) for 24-72 hours;
d) gradually increasing the pressure inside the reactor (B) up to regime values (0.5-5 MPa);
e) gradually reducing the concentration of inert gas to zero until regime conditions; and subsequently
f) gradually increasing the reaction temperature until reaching regime values (200-350° C.).

Synthesis gas essentially consists of CO and $H_2$, possibly mixed with $CH_4$, $CO_2$ and inert gases in general; it has a $H_2$/CO molar ratio ranging from 1 to 3 and preferably derives from steam reforming and/or partial oxidation of natural gas or other hydrocarbons, on the basis of the reactions described, for example, in U.S. Pat. No. 5,645,613. Alternatively, the synthesis gas can derive from other productions techniques such as, for example, autothermal reforming, C.P.O. (Catalytic Partial Oxidation) or from the gasification of coal with water vapour at a high temperature as described in "Catalysis Science and Technology", vol. 1, Springer-Verlag, New York, 1981.

When the reactor (B) is under regime conditions, periodic make-up of the catalyst is envisaged for compensating losses (in activity and material) during the overall production cycle, for example by flushings effected in the liquid-solid separation section.

In order to carry out the make-up of the catalyst, it is not only necessary to effect the melting of the pellets and their possible dilution with a solvent, but it is also preferable to proceed with the conditioning of the fresh catalyst before introducing it into the reaction environment. There is therefore a specific melting and conditioning section for this function which is essentially based on:

a vessel (C), equipped with an inlet for inert gas (3'), where the pellets of catalyst, after the addition of a solvent (8), are charged (7) and melted, similar to that adopted for the initial charging, preferably having smaller dimensions, which is run under the same conditions as those of the main charging vessel (A);

a reaction vessel (D), equipped with inlets for inert gas (5') and synthesis gas (6'), where the suspension is transferred (9) after melting, in which the catalyst undergoes the same conditioning process envisaged for the fresh catalyst used during the initial charging; said vessel (D) is designed for reaching higher pressures than those of the reactor (B) during normal operating conditions; after completing the conditioning procedure, in fact, the suspension is transferred (10) from the reaction vessel (D) to the main reactor (B) as a result of the pressure change.

The vessels (C) and (D) have outlets (13') for recovering the vapour phase (inert gas and/or non-reacted synthesis gas, and/or products of the synthesis reaction in vapour phase under the reaction conditions).

At the end of the conditioning phase of the catalyst and once the synthesis reactor (B) has been brought to regime conditions, the running of the latter can comprise a further two steps: stoppage (or shut down), with consequent reactivation, and a temporary stoppage phase, better known as stand-by.

The shut-down of a reactor (B) in which reactions are effected which take place in multiphase systems, wherein a gaseous phase, prevalently consisting of CO and $H_2$, is bubbled into a suspension of a solid in the form of particles (catalyst) in a liquid (prevalently reaction product), requires the following operating phases:

i. gradual stoppage of the feeding of synthesis gas (6) and its gradual substitution with inert gas (5);
ii. possible reduction of the operating pressure and temperature inside the reactor (B) to values close to those of the conditioning phase;
iii. discharging (4) of the suspension contained in the reactor (B) and (11) in the units associated therewith (E) and its recovery in the vessel (A) heated and flushed with inert gas (3); the transfer is effected by means of the difference in pressure, the vessel (A) having been previously brought to a pressure at least 3 bars lower than the reactor (B).

According to the present invention, the inert gas can consist, for example, of nitrogen or, preferably, of purified natural gas.

According to this embodiment of the present invention, once the suspension has been discharged from the reactor (B) and from the equipment (E) envisaged for the treatment of the suspension, such as degassing vessels and/or decanters and/or filters and other apparatuses such as recirculation pumps, and once the actions required for the shutdown phase have been completed, the reactor can be reactivated following the method described above, for example, for the charging phase.

The vessel (A) is designed to have a capacity which is such as to contain the volume of suspension present in the reactor (B) and in the other units (E), associated with the treatment of the suspension, at the moment of shut-down.

Should it not be necessary to empty the reactor (B) in the shut-down phase, in the case for example of a temporary stand-by phase, the latter comprises:
1. gradual stoppage of the feeding of the synthesis gas (6) and gradual substitution with inert and/or reducing gas, for example hydrogen (5) to keep the solid phase sufficiently dispersed in the suspension, at the same time minimizing any possible deactivation phenomena;
2. possible reduction in the operating temperature and pressure to values close to those of the conditioning phase.

In this phase, the reactor (B) can be kept in line with the treatment section of the suspension (E) which is completely recycled, (11) and (12), to the reactor without the extraction of products. Alternatively, the reactor can be disaligned from the units (E) after removing the suspension from the equipment (E) directly connected to the reactor (B). The latter is preferably designed to have a capacity which is such as to also contain the volume of suspension present in the units (E) at the moment of temporary stand-by.

The invention claimed is:

1. A process for the charging of a catalyst into a slurry bubble column reactor in activation phase which comprises:
   a) incorporating the catalyst, previously reduced, in a matrix of paraffinic waxes, solid at room temperature;
   b) melting and collecting the paraffinic matrix in a charging vessel, maintained at a high temperature, together with a diluent which is miscible with the molten paraffinic matrix and which is in liquid form both under the conditions present in the vessel and at room temperature, a stream of a first inert gas being distributed in said charging vessel from the bottom so as to obtain a sufficiently homogeneous suspension;
   c) pressurizing the charging vessel in which the complete melting of the paraffinic matrix has been effected at a pressure higher than that of the reactor maintaining the system fluidized by the continuous introduction of said first inert gas from the bottom of said vessel;
   d) transferring, due to the pressure change, a diluted solution from the charging vessel under pressure to the reactor, initially empty, maintained at a temperature higher than or equal to that present in the charging vessel flushed in turn from the bottom with a second inert gas (5);
   e) repeating steps (b) to (d) until a suspension level is reached in the reactor which is sufficient for aligning optional external equipment envisaged for the treatment of the suspension;
   f) repeating steps (b) to (d) until the normal operating suspension level is reached in the reactor and in the optional external equipment envisaged for the treatment of the suspension;
   g) feeding a synthesis gas diluted with said second inert gas to the base of the reactor.

2. The process according to claim 1, wherein the catalyst is englobed in paraffinic waxes in the form of pellets wherein the quantity of wax ranges from 30 to 70% by weight.

3. The process according to claim 1, wherein the catalyst comprises Co dispersed on a solid carrier consisting of at least one oxide of an element selected from the group consisting of Si, Ti, Al, Zr, Mg and their mixtures.

4. The process according to claim 3, wherein the cobalt is present in the catalyst in quantities ranging from 1 to 50% by weight with respect to the total weight.

5. The process according to claim 1, wherein the catalyst is used in the form of a finely subdivided powder with an average diameter of the granules ranging from 10 to 250 μm.

6. The process according to claim 2, wherein the catalyst englobed in the paraffinic matrix is brought to a temperature which is greater than or equal to 150° C. and diluted with a diluent liquid at those temperatures, and also at room temperature, until a concentration of solid ranging from 10 to 50% by weight, is obtained.

7. The process according to claim 6, wherein the diluent comprises an oligomer of $C_6$-$C_{10}$ α-olefins.

8. The process according to claim 1, wherein the pressure in the charging vessel is higher than that present in the reactor by about 0.2-0.4 MPa whereas the pressure inside the reactor is maintained at about 0.1-1 MPa.

9. The process according to claim 1, wherein in order to reach the normal operating level inside the reactor and all the optional pieces of equipment envisaged for the treatment of the suspension, the melting, dilution and transfer operation from the charging vessel to the reactor is effected from 2 to 30 times.

10. A process for the conditioning of a catalyst contained in a bubble column reactor suitable for reactions in heterogeneous phase, which comprises:
    a) regulating the temperature and pressures within the range of 200-230° C. and 0.5-1.5 MPa;
    b) gradually substituting an inert gas with synthesis gas, up to a concentration of inert gas ranging from 5 to 50% by volume and maintaining a partial water pressure (co-product of the Fischer-Tropsch synthesis reaction) lower than 1.0 MPa;
    c) maintaining the conditions of (b) for 24-72 hours;
    d) gradually increasing the pressure inside the reactor up to regime values (0.5-5 MPa);
    e) gradually reducing the concentration of inert gas to zero until regime conditions are reached; and
    f) gradually increasing the reaction temperature until regime values (200-350° C.) are reached.

11. The process according to claim 10, wherein the flow-rate of inert gas of (b) is regulated to maintain a partial water pressure lower than 0.3 MPa.

12. The process according to claim 2, wherein the catalyst comprises Co dispersed on a solid carrier consisting of at least one oxide of an element selected from the group consisting of Si, Ti, Al, Zr, Mg and their mixtures.

13. The process according to claim 2, wherein the catalyst is used in the form of a finely subdivided powder with an average diameter of the granules ranging from 10 to 250 μm.

14. The process according to claim 3, wherein the catalyst is used in the form of a finely subdivided powder with an average diameter of the granules ranging from 10 to 250 μm.

15. The process according to claim 4, wherein the catalyst is used in the form of a finely subdivided powder with an average diameter of the granules ranging from 10 to 250 μm.

16. The process according to claim 2, wherein the pressure in the charging vessel is higher than that present in the reactor by about 0.2-0.4 MPa whereas the pressure inside the reactor is maintained at about 0.1-1 MPa.

17. The process according to claim 3, wherein the pressure in the charging vessel is higher than that present in the reactor by about 0.2-0.4 MPa whereas the pressure inside the reactor is maintained at about 0.1-1 MPa.

18. The process according to claim 4, wherein the pressure in the charging vessel is higher than that present in the reactor by about 0.2-0.4 MPa whereas the pressure inside the reactor is maintained at about 0.1-1 MPa.

19. The process according to claim 5, wherein the pressure in the charging vessel is higher than that present in the reactor by about 0.2-0.4 MPa whereas the pressure inside the reactor is maintained at about 0.1-1 MPa.

20. The process according to claim 6, wherein the pressure in the charging vessel is higher than that present in the reactor by about 0.2-0.4 MPa whereas the pressure inside the reactor is maintained at about 0.1-1 MPa.

\* \* \* \* \*